3,344,280
ELECTROLUMINESCENT-PHOTOCONDUCTIVE
DISPLAY WITH LONG PERSISTENCE
Richard A. Martel, Sylmar, Calif., assignor to General
Precision, Inc., a corporation of Delaware
Continuation of application Ser. No. 330,164, Dec. 12,
1963. This application Aug. 4, 1966, Ser. No. 573,756
8 Claims. (Cl. 250—213)

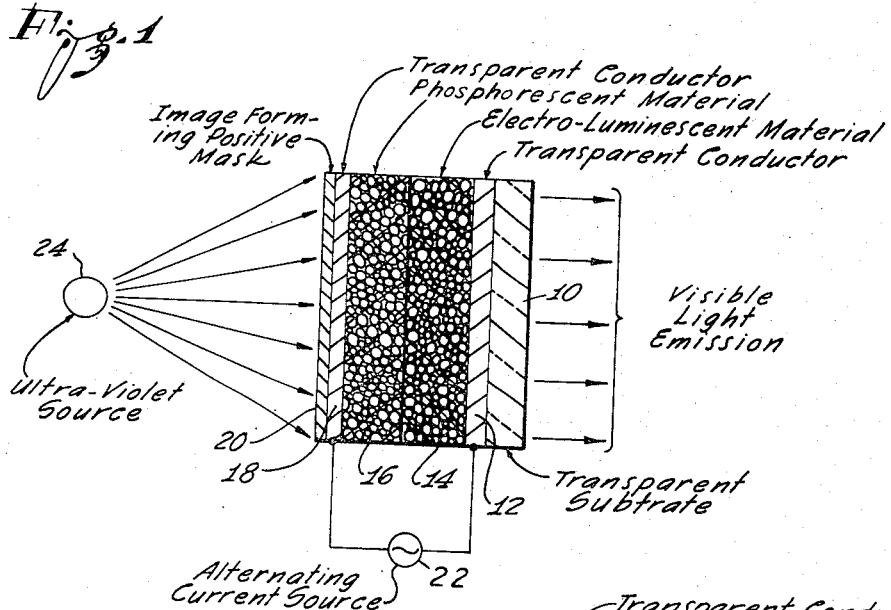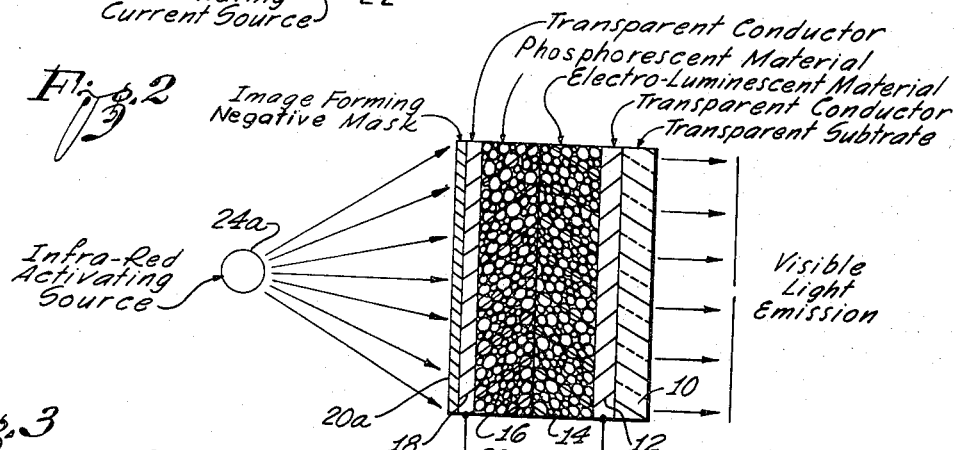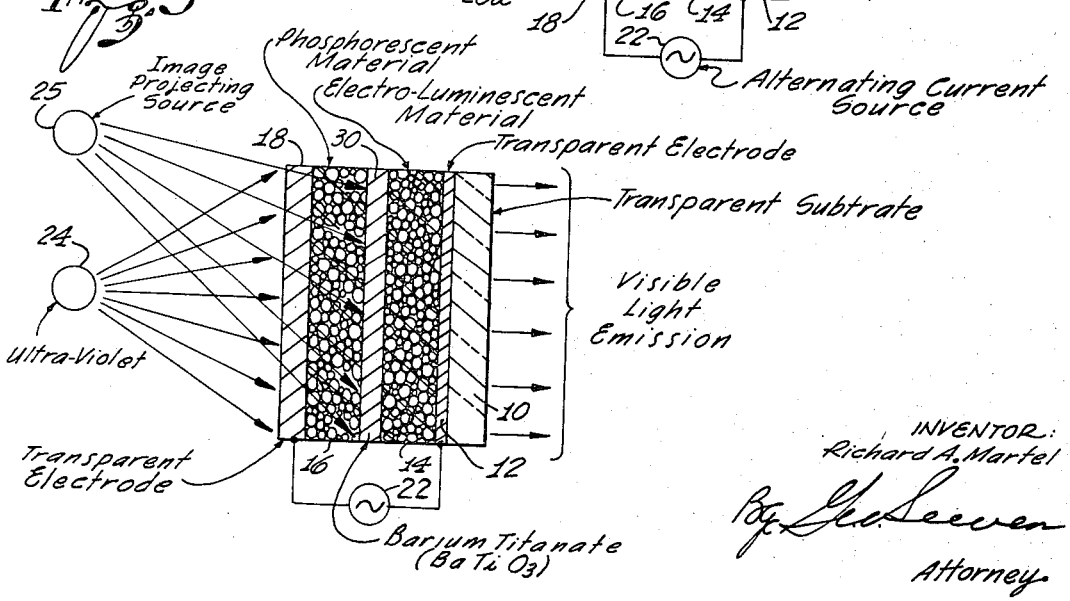

This application is a continuation of Serial Number 330,164, now abandoned, filed December 12, 1963, entitled, "Electroluminescent Panel Image Conversion Using Electroluminescent and Phosphorescent Materials," by the same inventor, Richard A. Martel.

This invention relates to a novel persistent radiation responsive display panel, and more particularly to a novel and improved display panel, or cell, capable of converting light of one wavelength to light of another wavelength, and of reproducing images with a controlled persistence.

The persistent radiation responsive panel to be described herein is embodied in a laminated cell construction. The different layers of lamination in the cell are arranged in a manner similar to that of a parallel plate capacitor, having a layer of phosphorescent and a layer of electroluminescent material sandwiched between parallel electrode plates.

The parallel electrode plates to be more fully described, are preferably composed of a thin transparent film of electrically conductive material, with two layers of material sandwiched therebetween. One of the layers is composed of a phosphorescent material having a selected suitable impedance change and which exhibits a relatively long impedance decay time after being excited by electromagnetic wave energy from a selected band of the spectrum. The other, or second layer, is composed of a suitable electroluminescent material.

As used in this specification, the term "phosphorescent material" is defined as any material which will, when excited by electromagnetic wave energy, emit visible light including the near ultra-violet, or near infra-red, and whose optical emission will persist for a time greater than $10^{-8}$ seconds after removal of the external excitation, and which have a relatively long impedance decay time or persistence with respect to the persistence of the optical emission.

As used in this specification, the term "electroluminescent material" is defined as meaning any solid material which may be excited to liminescence by the application of an electric field thereacross.

By way of explanation, and in order to assist in a more clear understanding of the operation of this invention, it is here pointed out that approximately all, if not all, phosphorescent materials, that is, those materials which are photoluminescent when excited by electromagnetic wave energy, will also exhibit an electrical impedance change which persists after removal of the energy. These materials and their electrical impedance characteristics are known. For example, Patent Number 2,990,473, issued to H. P. Kallmann on June 27, 1961, lists many photoconductors which, when activated in ways identical to the activation carried out in making them luminescent, will become phosphorescent and acquire the characteristic of stored latent photoconductivity in which a capacitive impedance change produced by incident electromagnetic radiation will persist for a long period after removal of the radiation and the termination of the visible liminescent of the material.

The electroluminescent material layer, in the preferred embodiment of this invention, is excited to luminescence by the application of an electric field applied through the panel. The brightness of any point on the electroluminescent layer is a function of the electrical impedance change of the adjacent point on the phosphorescent layer. That is to say, that the brightness of any particular point on the electroluminescent layer is coincidental to the impedance of a corresponding given point on the phosphorescent layer when the point on said phosphorescent layer is excited to brightness by electromagnetic wave energy.

A typical suitable material for the electroluminescent layer is a copper activated mixture of zinc oxide and zinc sulfide. Of course, other luminescent materials are also suitable. These materials are described, for example, in an article by Destriau in the "Philosophical Magazine" (volume 38, 1937).

The operation of the display panel or cell of the present invention is predicated upon the property of the aforementioned phosphorescent material to exhibit an electrical impedance change upon the excitation thereof by electromagnetic wave energy, plus the persistence of the impedance change long after the visible emitted light therefrom has ceased to be apparent to the naked eye.

Therefore, when an exciting radiation image is projected onto the phosphorescent layer, the image is displayed thereon by corresponding lighted and dark areas of the image. At the same time, the electrical impedance within the phosphorescent layer is reduced from point to point in a pattern corresponding to the projected image and, of course, in direct proportion to the light and shade values of said image.

When an electrical potential is applied across the plate electrodes of the cell to be described, and when a radiation image is projected onto the phosphorescent layer, the resulting changes in the impedance within the phosphorescent layer from point to point, causes (by voltage-divider action) the actual potential applied across corresponding points in the electroluminescent layer to have different values, corresponding to the light and shade values of the image displayed on the first layer.

The impedance and potential pattern described in the preceding paragraph enables the applied voltage to cause the electroluminescent layer to glow and to display the image projected onto the phosphorescent layer. Moreover, long after the image on the phosphorescent layer has ceased to be visible to the naked eye, the electroluminescent layer continues to display the image brightly, this being due to the persistence of the decreased impedance pattern across the phosphorescent layer long after the visible effects of the excitation have disappeared.

It has been found that phosphorescent materials which are capable of emitting light upon being excited by ultra violet radiations, for example, may be quenched and extinguished by the subsequent excitation thereof by infra-red radiations. This infra-red quenching characteristic used in certain of the embodiments of the invention to be described provides a means for erasing the image displayed by the electroluminescent layer wherever desired; or for displaying negative images by the selective infra-red quenching of the uniformly excited phosphorescent layer.

From the foregoing, it seems clear that an advantage of the present invention is that through the use of the phosphorescent material in combination with a read-out or sensing means in the form of the electroluminescent layer, there is provided an image-storing device or a read-out device with a memory. An image produced on the phosphorescent layer can be recalled at will so long as the decreased impedance pattern across the phosphorescent layer remains. Furthermore, inasmuch as the phosphorescent layer is being used normally, an image can be projected whether or not there is electrical potential applied across the device. The advantage of this latter use of the device is not only one of power savings, but also permits the device to be used where it is not desirable to apply voltage to the electrodes but where an image can be projected onto the phosphorescent layer. Later, but still during the time that the impedance decay is persisting, the image previously projected on the phosphorescent layer can be recalled. Furthermore, inasmuch as the persistence of the phosphorescent material is independent of the read-out device, that is, the electroluminescent material, the image impressed upon the phosphorescent material can be recalled intermittently or as long as desired so long as the electrical persistence remains.

Another advantage suggests itself immediately in the use of this device, and that is image comparison. This is suggested by reason of the fact that the impedance immediately after exposure gradually return to its normal value, and that is one of image comparison. Inasmuch as the intensity of the image projected on the electroluminescent material depends upon the intensity of the impedance persistence decay, it can be appreciated that the age of the stored image will vary the intensity of the image on the electroluminescent material. Therefore, it follows that if the electroluminescent material is exposed two or three times, various images can be compared by reason of their intensity. The usefulness of this device, that is, the comparison of the present or current image with a previously displayed image or images, can be appreciated when it would be desired, for example, to plot the path of a ship in the harbor or a submarine at sea which could be done by a series of images impinged on the radar screen containing the present invention. Thus, a ship could be tracked by a series of successive images, all of which could be recalled over a long period of time, and if the path of the ship was erratic, as, for example, by a shirp circling or zigzagging, the display having the present invention could nonetheless untangle the path and show the path intelligently by the intensity of the recalled image as a factor of time.

Still another advantage of the present invention is that during the time that the impedance decay persists, the device becomes a memory device with nondestructive read-out; that is to say that the image can be recalled at will as often as desirable without destroying the image portrayed on the phosphorescent material.

FIGURE 1 is a schematic, sectional representation of a cell constructed in accordance with the concepts of the invention and adapted to be excited by ultraviolet light, for example, in order to display a selected image;

FIGURE 2 is a schematic, sectional representation of a cell, similar to the cell of FIGURE 1, and which is excited, for example, by infra-red radiations for quenching or negative image display purposes;

FIGURE 3 is a schematic representation of a cell, siilar to the cell in FIGURES 1 and 2, but which includes an interposed shielding layer, for reasons to be described.

Turning now to a detailed description of my invention, the cell of FIGURE 1 may be formed on an appropriate transparent substrate 10 composed, for example, of glass or of other appropriate transparent material. A first conductive electrode 12 is formed on the substrate. This electrode, as mentioned above, may be in the form of a thin transparent film of electrically conductive material. The film may be formed on the substrate by vacuum deposition, or by other known techniques.

A layer of electroluminescent material, designated 14, is deposited over the conductive electrode 12; and a second layer, designated 16 of a selected phosphorescent material is deposited over the layer 14. A second film-like transparent conductive electrode 18 is formed over the layer 16. A suitable image forming mask 20 may be positioned adjacent the electrode 18.

A voltage from source 22 is applied across the electrodes 12 and 18. While the particular voltage to be impressed across the electrodes 12 and 18 must be specifically selected in accordance with the internal imped-ance of the combined panel or cell, it has been found that a voltage in the order of 100 volts at a frequency of 400 cycles operates satisfactorily in most instances. However, it is pointed out that the particular voltage chosen must be such that the impressed voltage across the electroluminescent layer 14 is just below that which will cause the electroluminescent layer 14 to glow with a visible intensity.

An appropriate source of electromagnetic wave energy, such as an ultraviolet light source 24, is positioned so that its radiations are projected through the image forming mask 20, and through the transparent electrode 18 onto the phosphorescent layer 16.

In response to the projected radiations of the energy from the source 24, the layer 16 is excited, and it glows in a manner to reproduce, in a positive sense, the image formed by the mask 20.

As mentioned above, the phosphorescent layer 16 also exhibits the characteristics of a decreased electrical impedance from point to point in response to the excitation of the layer by the radiations from the source 24. The decreased impedance pattern across the layer 16 is distributed from point to point in direct proportion to the light and shade values of the image displayed by that layer. Thus, a latent image is formed in layer 16 in the form of variations in impedance across the layer.

It will be appreciated that the layers 14 and 16 are connected in a voltage-divider manner across the alternating current source 22. The electroluminescent layer 14 glows at any particular point with an intensity which is proportional to the voltage impressed across it at that point. The layers 14 and 16, as embodied in this invention, are such so that when any particular point on the phosphorescent layer 16 is not excited by incident radiation, the impedance across the layer 16 at this particular dark point remains unchanged. Accordingly, the voltage impressed across the electroluminescent layer 14 at this particular corresponding point remains unchanged and the electroluminescent layer 14 does not glow. On the other hand, when a particular point on the phosphorescent layer is excited or illuminated by incident radiation, the impedance across the phosphorescent layer 16 at that particular point will be lowered, and the voltage across the equivalent point on the layer 14 will be raised sufficiently high to cause it to glow at this point. Thus, the phosphorescent layer 16 with its latent image formed by impedance variations is the control element that produces the visible image displayed on layer 14.

As long as the impedance at any point in the phosphorescent layer 16 remains below a certain level, the voltage across the electroluminescent layer 14 will stay above that required to excite the layer 14 and the image reproduced by this panel will continue to be visible. While it is not known exactly how the persistence of this impedance change in the phosphorescent layer functions, it is known that there is a definite relationship between the visible persistence decay time and the impedance decay time in the phosphorescent layer. It is also known that the impedance decay curve of the phosphorescent layer continues for a period many times longer than the visible decay time.

When the relatively long persistence decay time phenomena described above is utilized in accordance with the teachings of this invention, the power source 22 can be turned off or removed and then again turned on and the excited image on the electroluminescent layer will reappear. In actual practice it has been observed that this so-called extinguishing of the image and reproduction by simply turning the power supply on and off can be repeated indefinitely so long as the impedance across the phosphorescent layer remains low enough to cause a voltage drop across the electroluminescent layer sufficiently high to excite the electroluminescent layer to visibly glow.

It is here pointed out that while the preferred embodiment illustrating this invention teaches the excitation of the phosphorescent layer 16 by use of ultra-violet radiation this is not to be construed as negating the use of other electromagnetic wave energy for the exciting source. It is further pointed out here that the use of ultra-violet rays as the radiation exciting source is specifically taught because it has been found that certain phosphors conventionally used in phosphorescent layers lend themselves exceptionally well to the practice of this invention. Certain of these will glow and the impedance change with a relatively long persistence decay time likewise will be present. Also, it has been learned that certain phosphor materials can be used, especially excitable by ultraviolet light, that will permit quenching by infra-red of both the visible glow, as well as the impedance change, thus making it possible to cause the panel to revert to its original condition instantly when desired.

The panel of FIGURE 2 is similar in most respects to the cell described above in conjunction with FIGURE 1. In the latter cell, similar parts have been designated by the same numerals. However, in the embodiment of FIGURE 2, the source of ultra-violet radiations 24 is shown replaced by an infra-red source 24a.

The layer 16, as explained in detail in respect to FIGURE 1, is a phosphorescent material which responds to ultra-violet light to provide a visible image, and which may be quenched by infra-red radiations, as explained above.

In the embodiment of FIGURE 2, the entire panel is first uniformly excited by ultra-violet light for example. Then, a negative mask 20a is placed over the transparent conductor 18, and the panel is selectively quenched through the negative mask by infra-red radiations from the source 24a. This selective quenching through the negative causes the negative image to be displayed on the electroluminescent layer 14 as a positive image. This provides an assembly for rapidly and easily displaying positive images directly from photographic negatives. The display panel is particularly advantageous in that it is dry and does not require the usual wet developers, or other chemicals.

In the latter embodiment, the infra-red radiation, as mentioned above, causes a quenching of the excitation of the phosphorescent layer 16. When the infra-red radiation of the proper wave length is permitted to impinge on the phosphorescent material of the previously excited layer 16, the excited layer 16 is quenched in the pattern of the negative 20a, and the impedance of the layer 16 is uniformly returned to its previously relatively high value in that portion of the layer 16 exposed to the transparent portions of the negative mask 20a. Those portions of the layer 16 masked from exposure to the infra-red quenching will continue to exhibit an impedance change, thus producing a positive on the electroluminescent layer 14.

The cell of FIGURE 3 is generally similar to the cells of FIGURES 1 and 2, and again, like components have been designated by the same numbers.

In the embodiment of FIGURE 3, the layers 14 and 16 are separated by a shielding, or barrier, layer 30. This shielding layer is formed, for example, of barium titanate (BaTiO₃). The purpose of this shielding layer 30 is to protect the electroluminescent layer 14 from the effects of the radiation from the source 24. Any radiation reaching the electroluminescent layer 14 has a tendency to reduce its impedance, so as to counteract the corresponding impedance change in the phosphorescent layer 16.

As mentioned above, when the ultra-violet light from the source 24 impinges upon the phosphorescent material of the layer 16, a pattern of impedance changes occurs across that layer. As also explained, if an alternating current voltage is applied across the electrodes 12 and 18, a certain voltage distribution will exist across the electroluminescent layer 14, depending upon the excitation pattern of the layer 16.

Now, the excitation of the layer 16 produces corresponding decreases in the impedance of the layer from point to point. Should equivalent decreases occur in the impedance of the layer 14, there would be no corresponding increase of voltage across the layer 14, so that the electroluminescent image to be displayed thereby would either partially or entirely be obliterated.

Since the phosphorescent layer 16 is usually relatively thin, it is possible for the ultra-violet energy from the source 24 to penetrate into the electroluminescent layer 14. This penetration, as mentioned above, has a tendency to cause a partial, or total, cancellation of the effective voltage redistribution across the electroluminescent layer 14.

By interposing the barrier layer 30, composed, for example, of barium titanate, mixed with a binder, between the phosphorescent layer 16 and the electroluminescent layer 14, a barrier is provided such that less ultra-violet radiation will penetrate and impinge on the electroluminescent layer 14, thus reducing the deleterious cancelling effect.

Since the barium titanate barrier layer 30 is of a relatively low impedance, as compared with the phosphorescent layer 16 and electroluminescent layer 14, the voltage drop across the barrier layer 30 is relatively small.

Moreover, because the barium titanate barrier layer 30 is white in appearance, it contributes to the enhancement of the image displayed by the electroluminescent layer and viewed through the substrate 10.

The layers 14 and 16 can be made sufficiently thin to be transparent, and thereby permit a second non-persistent visible image to be projected through the electrode 18 and the layer 16 from a source 25 onto the screen formed by the barium titanate layer 30. This secondary image is often useful when, for example, the panel is used in plotter equipment. The layer 30 provides a good surface, or screen, for this purpose. Adequate filters must be provided in the projecting source 25 to filter out components of the light forming the visible image which would tend to excite the phosphorescent material in the layer 16.

As a modification, the light from the source 25 can be controlled to be in the yellow portion of the spectrum, for example, when a secondary image with no persistence characteristics is to be displayed on the barium titanate layer 30; and the light from the source 25 can be shifted toward the ultraviolet portion of the spectrum to excite the layer 16 when it is desired to retain the image on the display panel.

The use of the barrier layer 30, therefore, enhances the light output of the cell; and it also serves as a display screen. The barrier layer further serves to reduce the counteracting effects of the excitation of the electroluminscent layer 14 by the radiations from the source 24. The barrier layer 30 also provides a significant aid in matching the impedance of the layers 14 and 16 for the proper voltage distribution across the electroluminescent layer 14.

While particular embodiments of the invention have been shown and described, modifications may be made, and it is intended in the following claims, to cover all such modifications which fall within the spirit and scope of the invention.

What is claimed is:

1. A persistent radiation-responsive memory unit for storage and reproduction of images formed by incident radiation comprising:
   radiation-responsive phosphorescent material having latent photoconductivity storage characteristics for producing, within said material, an impedance image corresponding to the intensity of incident radiation; and
   sensing material coupled to said radiation-responsive phosphorescent material and responsive to impedance changes in said material for displaying said impedance image both continuously and intermittently during the existence of said impedance image.

2. The persistent radiation-responsive memory unit claimed in claim 1 wherein the impedance image is represented by a decay in value, point to point, in a panel corresponding to the visible image which decay persists long after the visible image has decayed.

3. The persistent radiation-responsive memory unit as claimed in claim 1 wherein said sensing means comprises:
electroluminescent means which luminesces when subjected to an electrical field to visibly reproduce the impedance image.

4. The persistent radiation-responsive memory unit claimed in claim 3 wherein said sensing means comprises:
electroluminescent means which luminesces when subjected to an electrical field to visibly reproduce the impedance image; and
means for applying said electrical field to both said layer of phosphorescent material and said electroluminescent means so that the impedance drop in said phosphorescent material to produce said impedance image direct more of said electrical field to said electroluminescent means.

5. The persistent radiation-responsive memory unit claimed in claim 4 further including a radiation-shielding barrier layer between said layer of phosphorescent material and said sensing means for permitting the application of said electrical field to said sensing means.

6. The persistent radiation-responsive memory unit claimed in claim 5 wherein said radiation-shielding barrier layer comprises barium titanate.

7. The persistent radiation-responsive memory unit as claimed in claim 4 wherein said means for applying said electrical field comprises:
first and second electrodes encompassing said layer of phosphorescent material and layer of electroluminescent material.

8. The persistent radiation-responsive memory unit as claimed in claim 7 wherein said electrodes are each in the form of electrically conductive transparent films.

References Cited

UNITED STATES PATENTS 2,835,822  5/1958  Williams _____ 250—211 X

RALPH G. NILSON, *Primary Examiner.*

J. D. WALL, *Assistant Examiner.*